3,400,392

CODE SIGNAL TRANSMITTER AUTOMATICALLY DEENERGIZED UPON TRANSMITTING AN END-OF-MESSAGE SIGNAL

Frederick P. Willcox, 261-1 Oenoke Ridge, and Newland M. Smith, 140 Llewellyn Drive, both of New Canaan, Conn. 06840; and Harold E. Levitt, 701 Chapala, Pacific Palisades, Calif. 90272

Continuation of application Ser. No. 574,893, June 29, 1966, which is a division of application Ser. No. 235,067, Nov. 2, 1962, now Patent No. 3,281,789, dated Oct. 25, 1966. This application Aug. 15, 1967, Ser. No. 660,837
5 Claims. (Cl. 340—365)

ABSTRACT OF THE DISCLOSURE

A time-sharing coded-message signal system for interrogating a central information store from any of plural interrogating stations, includes at each interrogating station a message-encoding keyboard, a recorder for storing a message set up by the keyboard, a wave signal transmitter, and a "Transmit" control key for turning on the transmitter when the stored message is to be sent. The interrogating station also includes a special key for appending to the end of the coded message an end-of-message code group, and an arrangement by which the transmission of this group automatically turns off the transmitter, to conserve power and minimize transmitting time.

This is a continuation of S.N. 574,893, filed June 29, 1966, now abandoned, which is a division of S.N. 235,067 filed Nov. 2, 1962, now U.S. Patent 3,281,789.

This invention pertains to information systems, and especially to systems in which a central store or "library" of information can be interrogated over standard communication channels from any of a multiplicity of remote stations, and which will cause available information from the store (on any selected subject of inquiry, and including the information that there is no stored information) to be transmitted to the remote station which originated the inquiry, and there reproduced in a form suitable for use by personnel.

A system of the above general type greatly extends the field of utility of available information storage equipment of the large-memory computer type. In a broad sense, of course, these memories are already arranged to handle inquiries from different stations as to stored information; e.g. from various arithmetic units forming a part of the computer. The answering of remote inquiries from stations many miles away, especially over existing or standard voice radio or wire channels, and where the equipment at the inquiry stations must be kept to a minimum as to size, cost and operational complexity, involves the solution of formidable problems.

It is accordingly a principal object of the invention to devise a system which any one of a multiplicity of manned remote stations may interrogate a single central store or memory, of any available or well known type, over a standard voice-frequency channel, and automatically receive an audible or visible clear-text report of the available information in the store dealing with the subject of the inquiry. A further object is to provide such a system in which the interrogation control at each remote station is extremely compact, simple and inexpensive, representing only a trifling addition (for example) to pre-existing two-way voice radio or telephone terminal equipment.

An additional object of the invention is to provide a system as described above in which, to simplify the incorporation of the system into a known or standard voice communication circuit, the remote inquiry unit comprises a simple alpha-numeric keyboard control for originating a coded inquiry signal of the Baudot type, and thereby controlling a conventional radio transmitter to accomplish the remote interrogation function. A further object is to provide such a system in which the pertinent stored information relative to the inquiry is read out or retrieved from the central store, and converted to suitable signals for transmission to the remote station; such signals may be either aural (voice) signals which will inform the operator of the remote station directly and without the need for further signal or code conversion operations or equipment at the said remote station, or the signals may be abbreviated codes which, after reception at the remote station, can there be converted to aural or visible clear text form for use by the operator.

Still another object of the invention is to provide a system of the foregoing type which provides an "in-use" or "busy" signal for remote stations that are on a common communication channel with another station which is making an inquiry, to obviate errors due to interference. A further object is to provide a system as above in which the use of the communication channel for human voice communications is in no way precluded or impeded. Yet another object is to provide for the making of special indications at the central station when an interrogation deals with certain subject matter, or elicits a certain kind of information. Another object is to provide such a system in which the duty status of remote stations is signaled to central station personnel.

An additional object of the invention is to provide a system of this kind including a pulse coded (for example an alpha-numerical pulse coded) transfer of the subject of the interrogation, and an answer-back including verification of the subject of the interrogation followed by transfer of the stored information available on that subject. This answer-back may be an automatically generated vocal transmission, but is (in a preferred form of the invention) a code signal which is converted at the remote station to an automatic aural or visible report suitable for direct comprehension by a human operator. A further object of the invention is to provide, at or near the central station, a printed-out or equivalent displayed indication of the stored information of particular kinds, when elicited by a remote inquiry, for human supervision or necessary collateral action.

Another object is to provide for a buffer storage of inquiry subjects specified over different inquiry channels, and automatic delivery of information related to those subjects, in turn, to appropriate ones of different answer-back or information-transmitting channels. A further object is to provide in such a system an automatic arrangement for sensing an improper or incomplete keyed-interrogation sequence, and preventing further processing thereof, as well as signalling to the remote keyboard operator that he must re-transmit a correct interrogation sequence.

The following abstract of the invention is based upon the application of its novel principles to a specific situation given hereinafter in greater detail, and is not intended as a limitation to such a particular application. This specific example deals with a central computer-type store of salient information related to automobile license plate registrations or registrants, such as description of vehicle, stolen car listing, criminal record of the owner, or the like. Each of a number of patrol cars is provided with a conventional two-way radio set for voice communications with a central station at (or linked to) which is the central information store interrogatable over one (inbound) radio channel from any patrol car. To minimize the added equipment in each car, a simple electrical or electronic alpha-numeric keyboard or console is provided to convert manually-keyed license plate numbers (including letters) into a serial-pulse-tone modulation of the existing car-radio transmitter. At the central station, the tone-keyed carrier interrogates a standard computer storage, which delivers the pertinent stored information in code form to a central radio transmitter and thence, over the same or another (outbound) channel to the radio receiver in the patrol car. The returned information may include verification of the identity of the remote station and of the license number, to minimize errors. At the remote station, the returned codes are temporarily stored, and on command are converted to audible or visible signals in clear text form, and can be repeated to the operators once or several times before the temporary storage is emptied for a succeeding operation.

A very rapid and accurate check of existing records on each license number is thus provided, available to police over a wide area such as a major city, and with a minimum of installation and operating cost. If desired, the interrogation codes set up by the keyboard can also be temporarily stored, for transmission at a time dictated by message traffic considerations.

Imperative practical considerations impose certain requirements on a system of this kind which can only be satisfied by particular combinations and features of the remote and central equipments. For example, where an existing voice radio system serves a large area with numerous remote stations such as police patrol cars or units, the time during which the radio system is "tied up" by each inquiry and response or answer must be minimized, so that a high speed of transmission in both directions is indicated if the traffic is to be handled efficiently; this requirement in turn suggests that coded signal transmission in both directions should be used. Even in the case of a keyboard generated inquiry code, the transmission time required can be made much shorter than that needed for manual operation of the keys, but only at the cost of some form of storage device at the police car. Likewise, coded transmission of the returning mesage requires a storage facility at the car plus equipment for decoding and translation to human language or equivalent signals. On the other hand, the total system cost of such a multi-car system will be heavily influenced by the cost of each car installation, a factor which would dictate the simplest possible apparatus in the cars.

The preferred form of the invention to be detailed herein includes many special features directed to a solution of these practical requirements, or to a rational compromise among the conflicting aspects such as those mentioned. However, in its broader aspect, the details can be varied within the scope of the inventive concepts, and as to such variations the details given are to be considered as illustrative or exemplary and not in a limiting sense.

*Typical operation*

A typical operational sequence will be of great assistance in obtaining an understanding of how the invention works, and is here set forth as a useful preliminary to a fully explanatory description. Upon deciding to direct a license query to the central station, a police patrol officer turns on a power control switch on his inquiry keyboard, lighting an indicator light and preparing the equipment for action. The officer then depresses in turn those keys which correspond to the inquiry message, for example his car's identification number and a license number to be investigated. As each key is operated, a corresponding code is recorded in a temporary storage medium, and the last code so stored is a special "end of message" code produced by depression of a special keyboard key. The complete inquiry message is thus prepared for radio transmission at maximum speed as soon as the radio system is free for such use, as indicated by the state of a "busy" signal lamp at the keyboard.

At that time, the officer operates a "transmit" key which turns on the car radio; it also initiates the rapid reproduction of the stored code inquiry sequences through a modulator which is thereby keyed to shift the audio tone frequency rapidly back and forth between values which key the carrier in accordance with the inquiry coding sequence, for example on the start-stop basis employed for teletypewriter communication. When the last ("end-of-message") code has been transmitted, the absence of further keying pulses is sensed and the car radio transmitter is automatically turned off, and the stored code erased from the storage device.

The inquiry code sequence is detected at the central station radio receiver, and stored for verification retransmission. The license number codes are applied to the addressing control of the file storage which may for example be constituted by a magnetic disc storage and retrieval system which is commercially available as the IBM 305 or 1401, Ramac system or the like. The stored information as to the inquiry-subject license number is read out into a buffer storage device, and when the radio system is available, is transmitted from the central office transmitter to the receiver at the car which initiated the inquiry, by a similar modulation process. As a part of this reply, the central transmitter also repeats the car number or designation and the license number, for verification by the patrol officer. If the central storage file contains no information on the inquiry subject, or if an incomplete inquiry is received, a code may be transmitted to call for a repetition of the inquiry by the inquiring officer. An end-of-message code is appended also to this transmission.

The "reply" code sequences arriving at the patrol car at high speed are there recorded in a temporary storage device (which may be the same storage device employed for inquiry-transmission). While the nature of the radio system results in transmission of the reply to the receivers of several cars, the initial codes thereof are the designation code for the particular car which initiated the query, and only its data-handling equipment is energized at that time, to prepare for the recording of the reply at that car. The operators at other cars are warned by their "busy" lamps or signals not to attempt to use their data equipment. When the "end-of-message" code is received, the storage device is at once conditioned for reproduction, and a "message ready" signal at the keyboard is energized. The car radio is immediately freed for normal use, and of course the central transmitter was freed as soon as it completed the transmission, removing the "busy" tone or signal as to all cars of the group.

At any convenient time thereafter, the car or patrol officer may operate a "listen" control of his keyboard, which will cause the recorded message codes to actuate a voice-data unit which will speak a pre-recorded word, numeral or short phrase for each code group so reproduced. Thus, the officer will hear his car designation, the license number about which he inquired, and an aural report if the license number is of a stolen car, wanted person, or the like. If there was no information, a signal inviting a repeated inquiry may be voiced. The recorded information may also be printed out or visually reproduced if the additional apparatus can be tolerated.

The message code recording is preferably not erased from temporary storage during reproduction, but is retained for further reproduction if desired. If it is stored in the same medium used for inquiries, it will be automatically erased as a preliminary to a succeeding inquiry transmission. A short time after completion of each reproduction of a reply message, the car equipment concerned with the code interrogation system is turned off to conserve operating life and power.

With the above in mind, the invention will best be understood by referring now to the following detailed specification of a preferred and exemplary embodiment thereof, taken in connection with the appended drawings, in which.

*Typical radio system*

Figure 1:
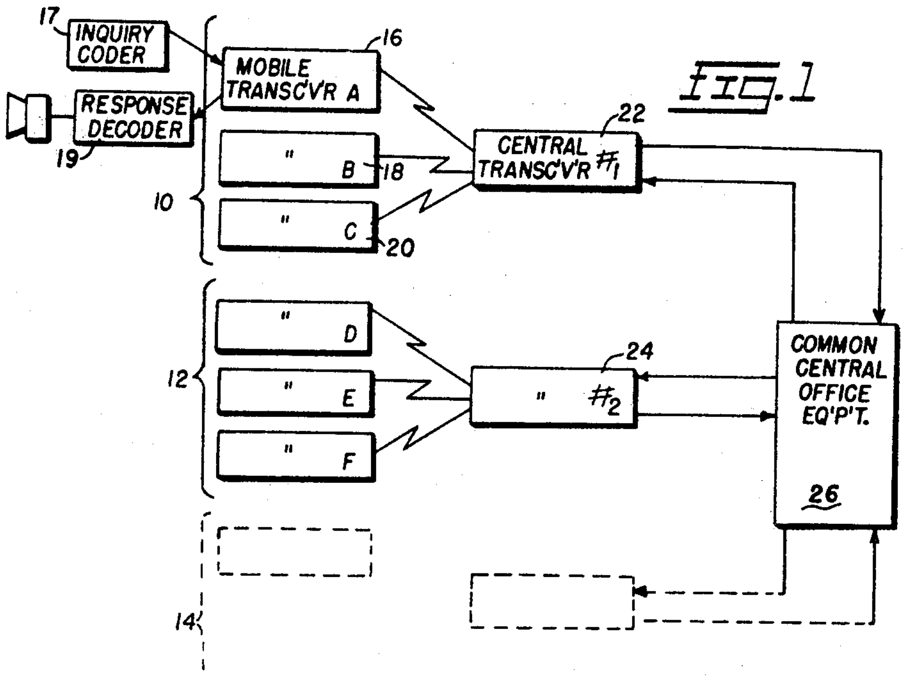
FIG. 1 is a schematic view of the mobile unit and central office relationship in a typical application of the invention to a police radio system.

Referring first to FIG. 1 of the drawings, a typical system arrangement is shown for a police radio system incorporating the invention. At the left of this figure are shown a plurality of police vehicles whose radio facilities are arranged in groups 10, 12, 14 operating on different channels. Typically, each vehicle will have a voice radio transceiver such as 16 whose transmitting frequency is shared with certain other vehicles 18, 20 and matched to the receiver frequency of a central office transceiver 22. The receiver frequencies of transceivers 16, 18 and 20 will normally be identical, and matched to the transmitter frequency of transceiver 22.

Similarly, another group 12 of vehicles will have transceivers which transmit on a frequency different from that employed for group 10, and receive on still another frequency common to this group, cooperating in this way with a second central office transceiver 24. For the purposes of the invention, all of the central office transceivers are connected to common data look-up, read-out and associated equipment indicated at 26.

In referring to the radio terminals as transceivers, it is not intended to restrict the system to units which share transmitting and receiving functions; separate transmitters and receivers can equally well be used. In addition, the allocation of particular frequencies for mobile-unit transmission and reception, and the extent to which central office equipment uses either transmitting or receiving frequencies common to several or even all of the mobile units, are to be selected to suit the needs of the particular system.

FIG. 1 also shows schematically an inquiry coder 17 by which the voice frequency channel of transceiver 16 is employed to transmit digital signals to the central office constituting an interrogation of the central store, and a response decoder 19 which will translate the response information to the mobile unit personnel for example over a loudspeaker, as shown.

*Typical mobile unit*

Figure 2:
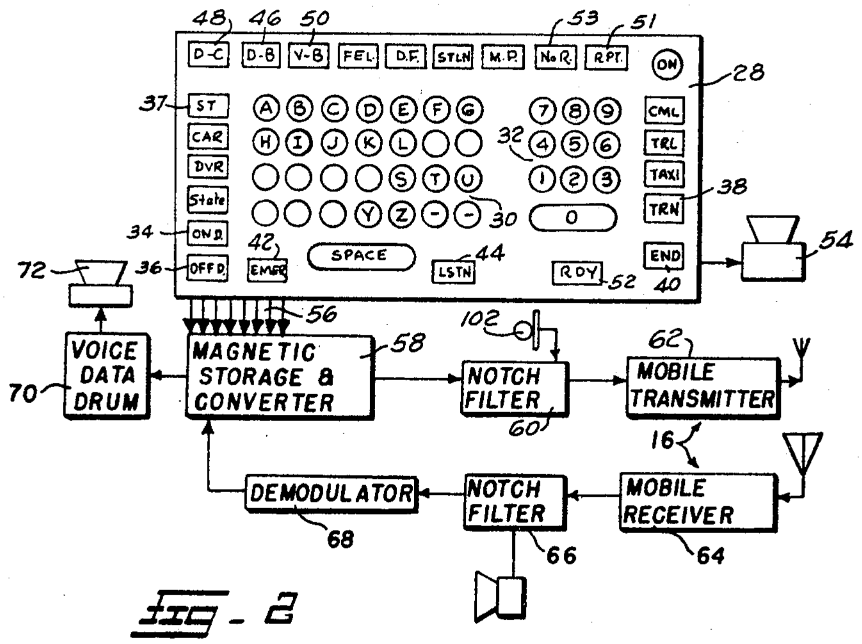
FIG. 2 is a more detailed schematic view of the mobile unit components of such a system.

The general arrangement of components for a single one of the mobile units is shown in somewhat more detail in FIG. 2 of the drawings, it being understood that this diagram is typical of the arrangements for the other mobile units of the system. Near the vehicle operator or other position convenient for manual manipulation is located a manual alpha-numeric code selecting keyboard, and indicating and control panel 28. The keys 30 are operated in succession to set up contact combinations (or energized-conductor combinations) unique to each letter of the alphabet, and keys 32 perform the same function for the numerical digits. The keyboard also includes control keys as follows:

34—"on duty" key
36—"off duty" key
37—"start message" key
38—"transmit" key
40—"end of message" key
42—"emergency" key
44—"reply repeat" key and indicator lamps or equivalent signals as follows:

46—"data busy" indicator
48—"data clear" indicator
50—"voice busy" indicator
52—"message ready" indicator.

The keyboard or console may also include an aural sounder or loudspeaker 54 which gives a verifying "click" or tone when each key has been positively operated, especially where the key operations themselves are such as not to give any other indication to the operator. This sounder may also be connected to emit a tone representation of the data signals (that is, to act as a "chirper") for emission verification, since the car radio speaker will not usually be on the car transmitter frequency.

The keyboard or console will normally be connected by cabling 56 to further items of equipment whose relative bulk may dictate their location elsewhere in the vehicle, although they may of course also be packaged with or at the keyboard within the spirit of the invention. These items, shown generally in FIG. 2 also, include a combined sequential code buffer storage and converter unit 58 whose function is to receive impulses or conductor-combination codes produced by the alpha-numeric keys 30, 32 (and others) which will occur in a random time sequence, and store them in parallel until the complete code designation (such as a start message code and a calling car designation, followed by a license plate designation of several letters and numbers) has been entered in the storage. The "start message" code has a purpose related to the central station operations, but its key operation may also be employed to erase and reset the sequential storage device to record the code sequences. When the operator has so stored the complete "query" code, he will operate the "end of message" key 40 to store a fixed code that will later advise the central office equipment that it has received all of the transmitted query, and that will also turn off the vehicle transmitter after the complete query code series has been emitted. Having operated the "end of message" key, the operator can cause the query to be transmitted over the radio system (that is, whenever the channel is not "busy") by operating the "transmit" key 38. This initiates operation of unit 58 to "read out" the codes stored therein in timed order serially, and emit them as successions of fixed audio tones to a narrow-band notch filter 60 and thence as modulations of the carrier of the existing vehicle transmitter 62 of the car radio 16.

FIG. 2 also illustrates the functions during reception of a coded reply message from the central office at the vehicle receiver 64. These time-serial narrow-band pulses pass notch filter 66, are demodulated at 68 and enter the code converter at storage unit 58, which converts the sequential bits of each character of the reply to parallel form, while maintaining the serial sequence of successive characters, which may be coded to signify letters, digits or words or phrases. Upon reception at the vehicle, these codes are sequentially stored in unit 58 which later transmits these reply codes to a voice-data converter 70 which emits voice-equivalents through a loudspeaker 72, but retains them also so that the operator can have the voice information repeated as often as desired by operating "reply repeat" key 44. The stored codes will be automatically erased when a subsequent inquiry message is presented to the storage device by the keyboard. If separate storage devices for the query to be transmitted and for the reply are provided, this automatic erasure by a new reply can be used, but if it is desired to economize on storage capacity, the erasure may effectively result as stated, merely from the operation of start message key 37 in preparation for encoding a new inquiry series. The use of DC recording pulses on a magnetic tape record allows a new code to be superposed upon a previously recorded one to give an effective obliteration of the former one.

The functions of auxiliary controls and indicators shown in FIG. 2 will be explained as the description of the complete system continues.

Figure 3:
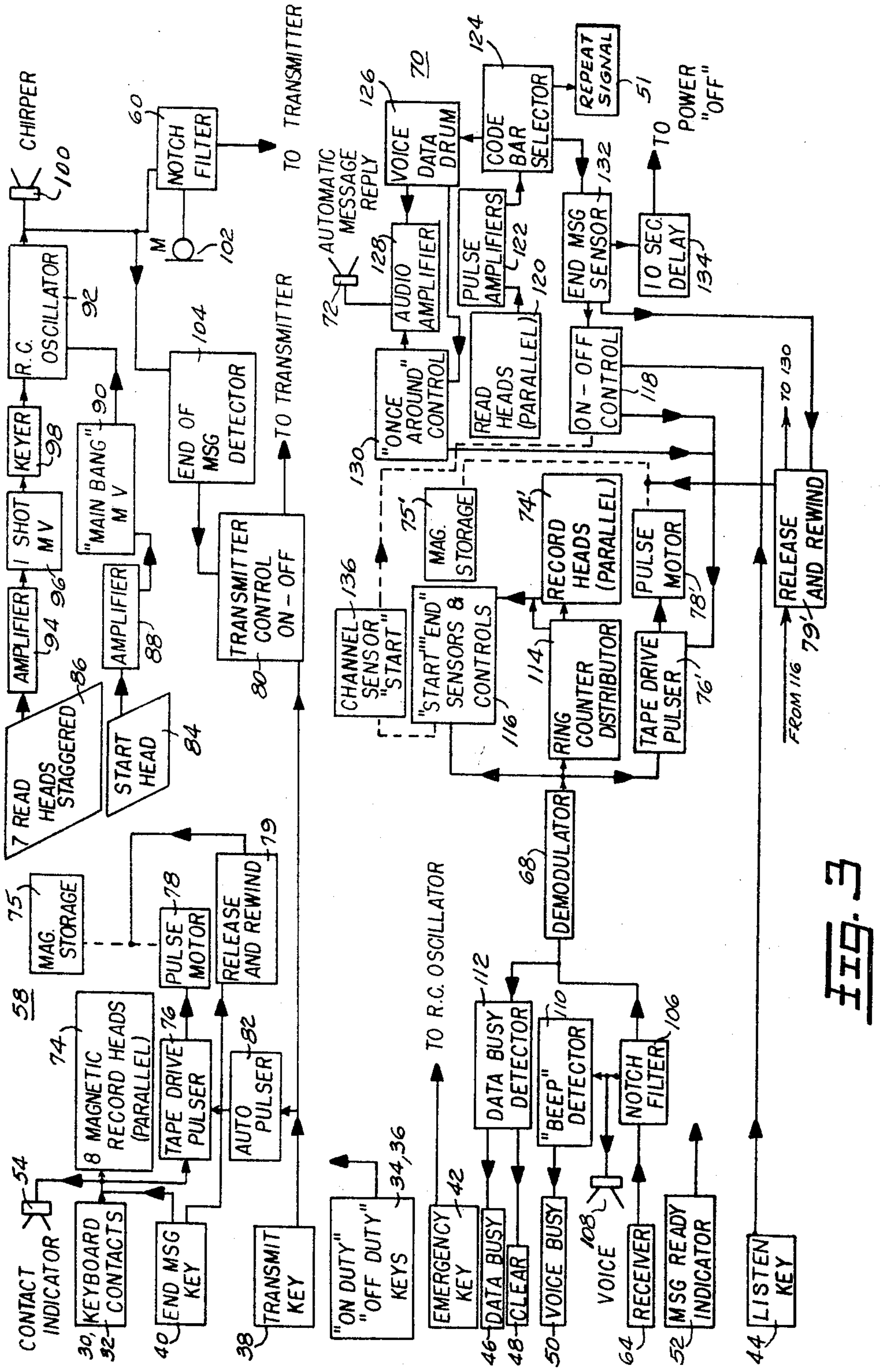
FIG. 3 is a functional block diagram of the interconnections amongst major component parts of the mobile unit of FIG. 2.

FIG. 3 of the drawings illustrates the equipment of FIG. 2 in more detailed form, utilizing the same reference numerals for corresponding parts, and enabling the flow of control signals to be followed throughout the mobile installation. Commencing at the upper left, and after the "start" message key has been operated, keys 30, 32 are operated in sequence to set up a stored code sequence such as the mobile station's number and a license "number," indicator 54 tells the operator when each key has been positively operated. The actual code employed may be for example an *n*-out-of-6 type similar to a six-bit teletypewriter code with a separate start pulse, and if desired with parity check or other validity checking features of which the prior art affords many examples. As each contact group is selected by an operated key, the appropriate one, two or three or more of the recording heads 74 of the storage or tape unit 75 are energized simultaneously to apply DC magnetic spots in appropriate positions crosswise of the magnetic medium; a common contact of all the keys simultaneously energizes a longitudinal drive control 76 to advance the tape or medium by a stepper motor 78 from beneath those heads to bring the next storage section into position beneath the heads for registering the code for the next character. The same common contact causes a "bit" to be recorder in one storage channel (crosswise position 8) regardless of which character has been coded. This operates as the start pulse control for the character bits for sequential transmission.

When the several characters of the query (license number) have been keyed for the operator, he operates "end of message" key 40 which records a special côde combination on the storage tape. It may also energize mechanism 79 which releases the tape (or equivalent medium) from pulse drive motor 78 and allows the medium to be quickly returned to its "home" or normal starting position. Unless one of the indicators 46 or 50 is indicating a busy condition, called for by an audio tone received from the central office, the operator now operates his "transmit" key 38 which turns on his vehicle transmitter by on-off control 80 and also initiates an automatic pulser 82 to energize the storage medium stepping motor 78 at a reasonably fixed cadence. Alternatively, the vehicle transmitter may have been turned "on" during the homing operation above mentioned. This action causes the crosswise recorded "bits" of each character to pass beneath a set of reading heads staggered with respect to tape motion. The head 84 is positioned to sense the "start" pulse first, and thereafter each bit of the seven character-defining bits is sensed in turn by the seven heads 86. The start bit or pulse is amplified at 88 and fires a start or "main bang" monostable multivibrator 90 which keys on an RC oscillator 92 (or equivalent) to emit a first audio tone frequency, for a timed pulse interval equal to the sum of the bit times required by the code. The "main bang" multivibrator would not be required if other means are provided to produce the proper total duration of oscillator tone output.

The seven read heads 86 are connected in parallel, and as the tape passes beneath them, the occurrence of an "on" or mark bit beneath any head produces a signal amplified at 94 to trigger a shorter-period monostable multivibrator 96 and thereby to supply a mark pulse of calibrated duration to a keyer 98 which momentarily shifts the tone frequency of oscillator 92 to a second audio ton frequency. Blank off or "space" bits or bit positions passing under heads 86 merely leave the oscillator 92 at its first frequency.

The sequence of audio tone for each key-selected character or function is passed by the oscillator to the "chirper" cr speaker 100 (which may optionally be combined with indicator 54), and also to the notch filter 60 and thence to the vehicle transmitter. Notch filter 60 is a narrow-band filter which separates on a frequency basis the two tones used for data-keying from the audio spectrum of the transmitter channel, and hence prevents any fortuitous transmission of codes when the transmitter is being modulated by speech at the existing vehicle radio microphone 102.

The tone output of oscillator 92 is also conducted to a detector 104 which responds only to the end-of-message code sequence keyed at key 40, and operates after a short delay to operate control 80 to turn off the vehicle transmitter. A push-to-talk switch (not shown) forming part of the conventional voice radio transmitter overrides control 80 to permit usual operation of the equipment for speech transmission.

The receiving functions of the vehicle equipment will now be described, leaving until later the description of the central office equipment which produces the received signals. In the case of a coded reply to a license number query, these signals will again be of two-tone audio teletypewriter type including a "start" bit for each character, and an end-of-message code combination. However, in addition to codes for alpha-numeric characters, additional word or phrase identifying codes will be employed, since the translating equipment will permit the automatic vocal reproduction of a number of pre-recorded report phrases of frequent usage. A great deal of channel time is saved by this system, with the further advantage of repeated playbacks to the car personnel with no increase in channel usage.

Referring to the bottom left of FIG. 3, the conventional car receiver 64 transmits received signals through notch filter 106 (which may optionally be the same unit as filter 60 if the complication of changeover switching can be tolerated) to the existing car radio speaker 108. These voice signals also are applied to a narrow-tuned beep detector 110 which operates the voice-busy indicator 50 whenever this busy tone is being received. Data code signals only are passed by filter 106 to the conventional demodulator 68 and also to the "data busy" detector 112 which operates the data busy indicator 46 whenever data codes are being received and operates the "clear" indicator 48 when no such codes are being received. These codes are not audible in the vehicle speaker 108.

Demodulator 68 produces series of DC pulses corresponding to the received response codes. These pulses are applied to parts which, like notch filters 60 and 106, need not be duplicated for transmitting and receiving functions, but may be switched to satisfy both operations. This relationship is indicated by use of the same reference numerals for these optionally-common components, with a prime mark added.

First, the first received code bit energizes the tape step drive pulser 76′ to step the storage tape 75′ by means of stepper pulse motor 78′ one step. The same first bit also triggers a ring counter distributor 114 which directs the received pulses in each group to respective ones of the start-pulse recording head and the seven (or more) message-recording heads at 74′, so that the combination of "mark" bits in each character code are recorded on the tape 75′ in a crosswise row or array. The tape drive pulser is too slow-acting to make more than one step for each character code sequence, and it is relatively immaterial whether the tape step motion occurs before, during or after each character code sequence. The successive message characters are thus recorded on tape 75′ as crosswise arrays of bits. The incoming code sequences are so spaced, character by character, that pulser 76′ will recover between characters and be ready to respond to the next start pulse. Alternatively, the distributor 114 may deactivate pulser 76′ after each start pulse and until completion of its operating cycle.

When an end-of-message code sequence is received, it is recorded at the end of the set of recorded character sequences on tape storage 75′, and is also sensed at 116 and operates the "message ready" indicator 52. It also operates the release and rewind 79′ to restore the tape to its first or "home" position. At any later time, the operator may operate "repeat" key 44 to energize on-off control 118 which sends an initial step impulse to pulse motor 78. The tape unit 75′ is stepped to bring the first character code row beneath sensing heads 120, whose respective output pulses are amplified at 122 and set up combinations of the code bars in a code bar selector 124, each such combination in turn selecting for reproduction a particular vocal letter, number, word or phase prerecorded on a multitrack voice data drum 126 which is constantly rotating past a signal pickup array connected to the speech amplifier 128 and thence to message speaker 72. Speaker 108 of the existing radio receiver may equally well be employed for this purpose. Each revolution of drum 126 thus effects audible reproduction of one character, word or phrase, and when the drum completes each rotation, it operates a "once around" control 130 which (a) resets the code bar selector 124 to its neutral condition to prevent repetition of the word and prepare the selector for the next word selection, and (b) impulses pulser 76′ to cause heads 120 to read the next code combination.

When the end-of-message code on tape 75′ reaches, and is set in selector 124, it operates sensor 132 to turn control 118 "off" and thereby discontinue the step motions of the tape due to pulser 76′; sensor 132 also triggers the release and rewind mechanism 79′ to restore the tape to its home or starting position, and, via delay circuit 134, turns off the power supply for the read heads 120, voice data drum 126 and related components.

The foregoing description required an operation of the listen key 44 to initiate the first vocal reproduction of the stored message. Repeated reproductions, at will, can be obtained by successive operations of the "listen" key 44, until the message has actually been erased as already described.

A useful auxiliary feature will prevent the garbling of a "live" voice message during its reception at the time a coded message is, or is about to be, reproduced. If separate audio channels are provided, the reception of a live voice message at notch filter 106 can be made to mute the coded-voice audio channel automatically, thus giving priority to such live voice information. The coded-voice message can, of course, be reproduced thereafter if desired.

*Central station*

Figure 4:
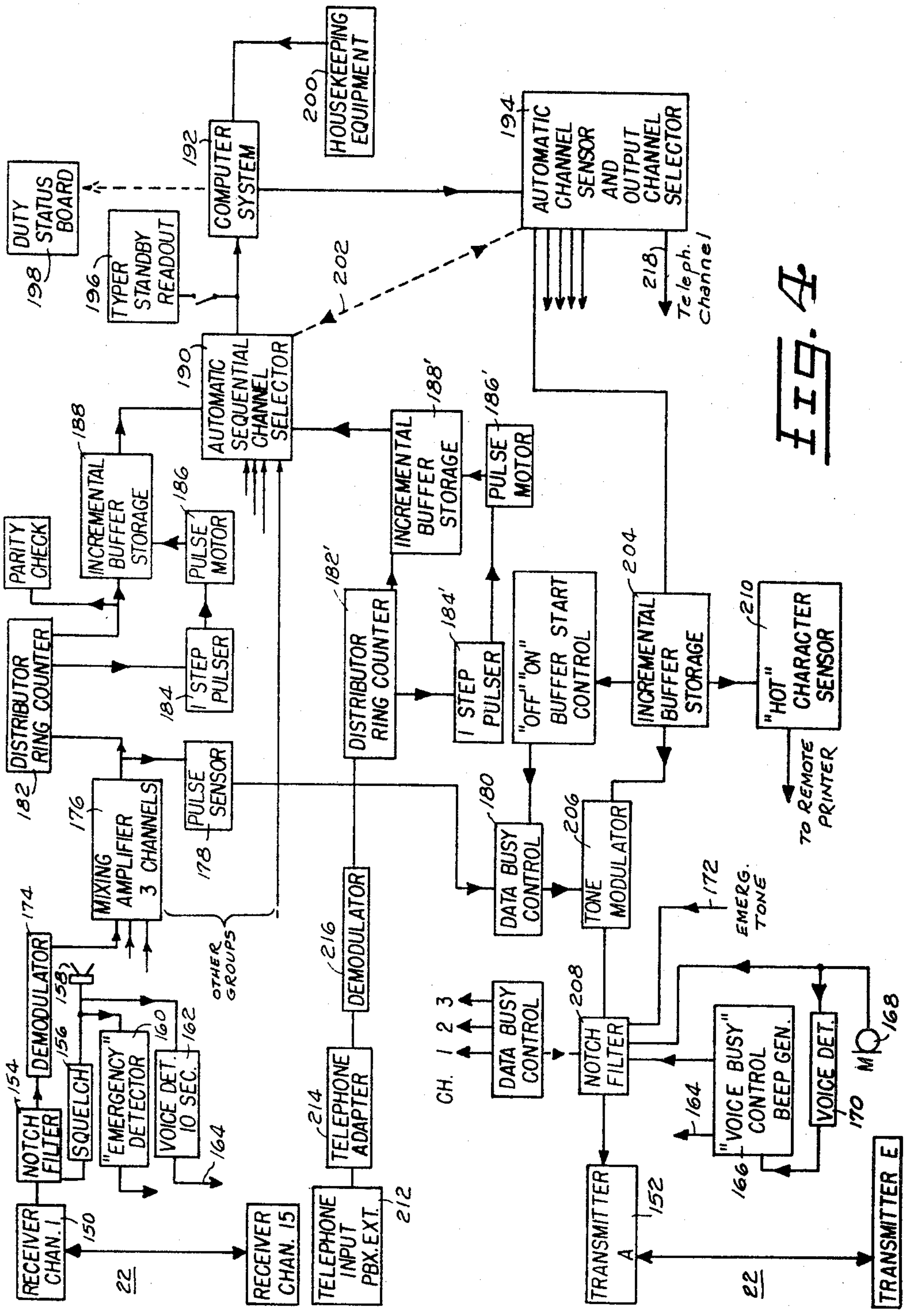
FIG. 4 is a block diagram similar to FIG. 3 but showing the components of the central office equipment.

Turning now to FIG. 4, the channel receivers 150 and transmitters 152 constitute the elements designated as transceivers 22 in FIG. 1. The typical receiver 150 has its output directed to a notch filter 154 whose voice output is passed through usual squelch circuit 156 to central station operator's speaker 158. It also passes to an "emergency" signal code or tone detector 160 which operates a special alarm and may for example switch the call to an emergency supervisory position. The squelch circuit output also is conveyed to a voice detector 162 whose output at 164 turns on the "voice busy" signal tone generator 166 to warn off other voice calls from cars sharing the channel. The station operator's microphone 168 exercises the same control of the transmitter 152 via voice detector 170. To signal a general emergency call, an alarm tone can be applied at 172 to the transmitter.

Pulse codes passed by notch filter 154 are demodulated at 174 and applied to a mixing (multiple input) amplifier 176 which can thus serve several, for example 3, input or receiver channels. For 15 receiver channels, there will thus be 5 of such mixing amplifier channels, but only one is detailed.

Any pulse code output from amplifier 176 supplies a signal to pulse sensor 178 which operates the "data busy" control 180 of the appropriate channel transmitter 152 for the purpose of transmitting a tone signal that will warn against other pulse code queries on that channel. The output of 176 also is fed to the distributing ring counter 182 which controls pulser 184 to step the motor 186 eight steps for each data character. The pulses also pass to an incremental (stepwise) buffer storage 188 operated by motor 186, and equivalent to the buffer storage 75 of FIG. 3. Upon completion of recording the storage medium is reset (without erasure) in preparation for reproduction of the code series to the computer look-up system. This resetting of the buffer storage is effected by the "end of message" code. When the code series has been recorded, and when that buffer is next sampled (in turn) by the channel selector 190, it will discharge its pulse bits through the channel selector to the computer system 192 to cause the specified license number to be "looked up" and delivered in code form to the outgoing channel selector 194. The storage 188 will then be erased and reset.

For use when the computer system is out of service, inquiry codes can be recorded by a unit 196 for manual look-up or for delayed insertion into the computer system. Operator monitoring of the computer is indicated at 198, and usual computer housekeeping equipment at 200. The latter takes care of updating the filed information and similar functions as well understood in the art.

Outgoing channel selector 194 is controlled by the sampling (input) channel selector 190 over link 202 so that the file information will be delivered to the proper transmitter (152, in this instance) to reach the car which originated the inquiry. However, the information is first stored in step-by-step buffer storage 204 analogous to storage 75 of FIG. 3, and is applied to modulator 206 only when the corresponding input channel (marked "busy" by pulse sensor 178) is free. The modulator passes the coded answer to notch filter 208 and thence keys transmitter 152 to send the answer (and verification) codes to the inquiring remote station. Buffer storage 204 is then reset and erased.

The output of buffer storage 204, if preceded by a special-attention or "hot" character furnished by the computer look-up for certain designated license or operator numbers, is passed to a supervisory position printer or alarm, by sensor 210.

The inquiry, look-up and file read-out functions can also be utilized in connection with telephone line adjuncts, either local or remote. To illustrate this, we have shown a telephone line input at 212 controlling a data-tone receiver 214 which via data-tone demodulator 216 operates a ring counter 182′, pulser 184′, pulse motor 186′ and buffer storage 188′ equal to their unprimed corresponding devices as above described. From channel selector 190, this input acts in the same way as a radio query, but link 202 causes the information to be delivered to the telephone channel at 218.

*Incremental buffer storage*

Figures 5, 6:
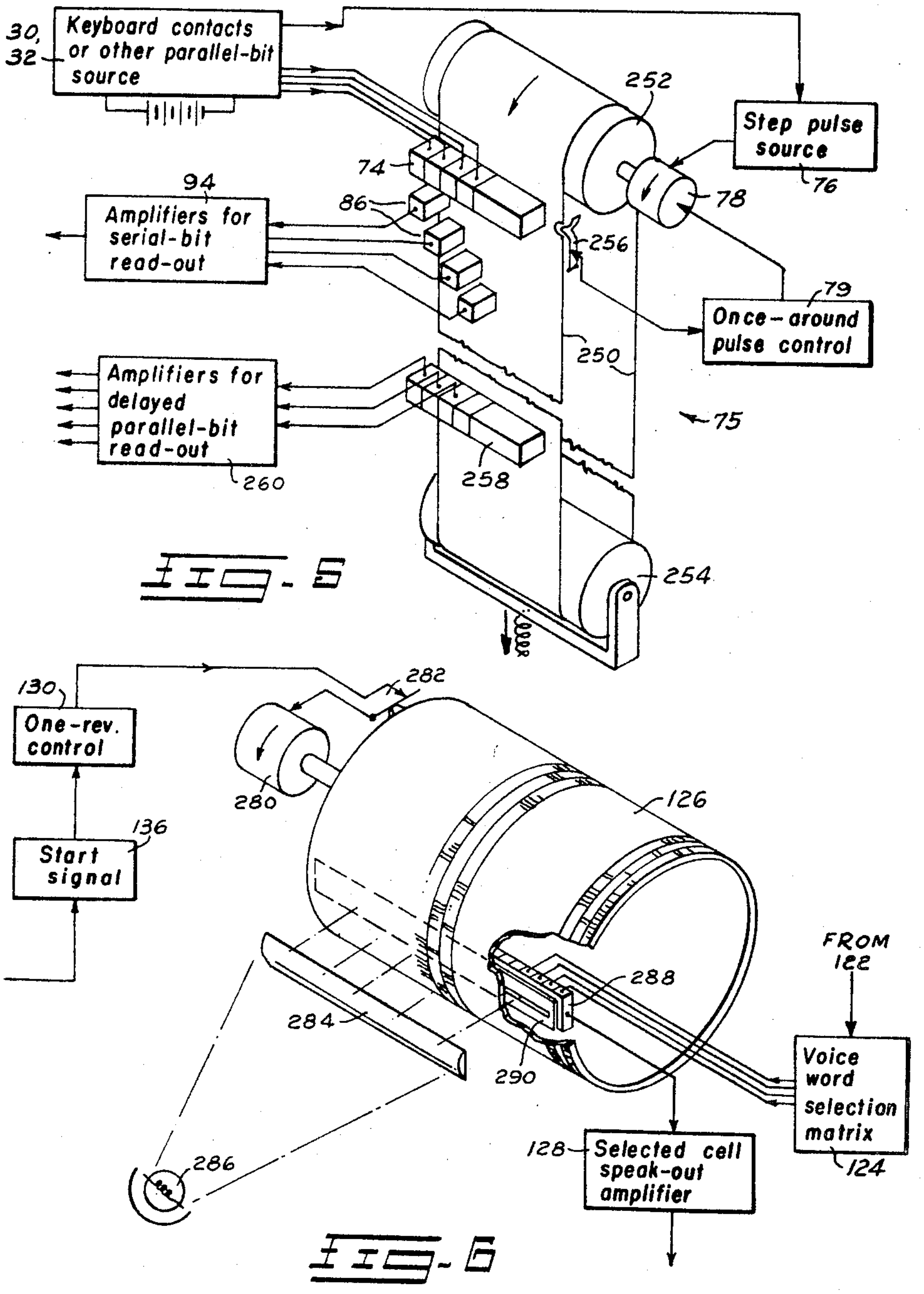
FIG. 5 is a schematic perspective view of one form of incremental storage buffer used with the system.
FIG. 6 is a similar view of a voice read-out unit for coded control of aural reproductions.

FIG. 5 is a schematic view of one form of incremental storage device which will serve the purpose of unit 75 of FIG. 3 and similar devices referred to elsewhere herein. In essence, this device is capable of receiving a serial binary code group of *n* bits and storing it in such a way that at any later time it can be repeated as a parallel binary code of *n* channels, with or without erasure, and will then be automatically prepared either for a repeated read-out or for a following recording. By an obvious symmetry, the same device can be used to receive parallel groups and emit them on command as serial bits. Furthermore, the device can be used for delayed repetition of codes, reproduced in the parallel-bit mode on command.

The incremental buffer storage is shown in FIG. 5 as constituted by a magnetic tape 250 of adequate width wrapped about a drive cylinder 252 and maintained in tensioned condition by a spring-biased idler cylinder 254. A stepping motor 78 is energized by pulses from the step pulse source 76 which, in the case of the keyboard buffer, is triggered from a keyboard contact closed once for each character being encoded. The code-selecting contacts of the keyboard 30, 32 apply DC pulses to the aligned recording heads 74, so that the bit combination for each operated key is recorded as magnetized spots crosswise of the magnetic tape 250, the latter being advanced one step for each such row of recorded bits. Serial read-out of the recorded bits is accomplished, as already described, by the staggered reproducing heads 86. In the drawing, the spacing of the various heads is shown in an arbitrary manner; actually, the staggered heads 86 will necessarily occupy a lengthwise tape extent equal to one stepwise advance of the tape, or, during readout, the tape will operate at a higher average speed than that produced by the random key actuations. Amplifiers indicated at 94 reproduce the recorded code in time-serial bits when the tape 250 is passed over them after having been first restored to its "start" condition without erasure.

The tape 250 may be restored to its "start" condition or position by motion in the reverse direction, or by forward stepping to the starting position, if an endless loop is employed, as shown. This one-revolution return movement is controlled by the once-around control 79 which may pulse the motor 78 until the circuit is interrupted by the position-sensing switch 256 in a well known manner.

The same device can be used for delayed reproduction of the recorded bits in time-parallel form, by supplying a set of crosswise readout heads 258 furnishing signals to readout amplifiers 260 positioned at a predetermined distance from the row of heads 74. Normally, the same incremental buffer would not include all of these features, but they are so shown in FIG. 5 to avoid needless repetition of details which will be clear from this showing, to those skilled in the art. It will be recognized that the tape 250 can be replaced by a drum or disc with suitable provisions for the disposal of the necessary recording and reproducing heads.

The typical action of the buffer storage provides for the recording of successive codes (bit combinations) during one series of forward steps of the tape, after which the tape is returned to its starting position and thereafter advanced, stepwise or continuously, to pass the recorded bit spots beneath the read-out heads. When erasure is to be accomplished, any desired system may be employed, with a separate cross-wise erase head selectively energized with the necessary erasing current, or effectively by over-recording by a new series of DC pulses in a known manner. These details are not necessary for an understanding of the system operation.

A unit such as just described will operate as a serial-to-parallel mode converter if successive bits from an input source are switched in succession to the crosswise-aligned recording heads while the tape is stationary, and the resulting row of magnetic spots is read out simultaneously by the second cross-wise aligned set of heads.

The voice data unit mentioned above may be characterized by the construction illustrated schematically in FIG. 6 of the drawings. Here, the voice data drum 126 is shown as carrying about its periphery a plurality of pre-recorded sound tracks here shown as optical sound tracks for reading by a photoelectric system. One track will be provided for the name of each letter, digit or like character to be employed in the system, plus several tracks pre-recorded to reproduce desired clear-text words, phrases or the like. The drum is arranged for rotation by a drive motor 280 through a one-revolution control 130 synchronized by a mechanical switch 282 so that upon command, the drum will be given one complete revolution and then stop until a further command is received from the start signal device 136.

During each revolution, the entire width of the transparent drum is exposed to a concentrated line of light from a cylindrical lens system 284 and light source 286. Within the drum, and parallel to the line of light thus produced, lies a linear array of PN junction photosensitive (solar) cells 288, separated from the sound tracks by a narrow slit 290. The cells 288 may have a common electrode, supplying read-out (or, rather, speak-out) signals to the common amplifier 128. Only that one cell, however, will be energized, which is supplied with electrical current from the selection matrix 124 which may be a diode or transistor matrix, a relay-tree, matrix or the like, capable of energizing any single output circuit (to a selected cell) when a set of control conductors are energized in a coded way. The operation of such selection matrices, and their various constructional forms, are also familiar to those skilled in electronics.

It was described above that the prevention of receipt and recording of replies from the central station, except at the car or station which initiated the particular inquiry, was precluded by operator action. That is, the initiation of an inquiry transmission from one car caused the central transmitter to apply to all cars on that receiving channel a tone or signal lighting their "busy" signals, which would be ignored by the operator who had seized the channel. More sophisticated systems will readily occur to those familiar with this kind of multiple-channel operation of radio system.

It will have been observed that since the selector 124 of the voice-data unit described herein responds to particular reply codes to control the generation of automatic voice information words or phrases corresponding thereto, the same selector can distinguish particular control codes received from the transmitter and thereupon cause other control actions. Thus, if an incomplete inquiry code sequence is sensed by the central station, as by means of a bit counter, the output of such sensing counter can be used to transmit the necessary "reply" code to cause selective energization of a relay which lights the "repeat" signal 51 of FIGS. 2 and 3. It may at the same time cause operation of the aural or vocal word "repeat." When a special signal produced by the computer (when it has found that there is "no information" as to an inquiry subject) is transmitted, the same selector 124 will cause the lighting of the signal 53 of FIG. 2, and signal 51 also, if desired. Usual self-latching relay circuits may be employed to maintain these signals lit for a desired interval or until the repeated inquiry coding has commenced.

In connection with the automatic re-transmission from central of the car or inquiry station's identifying number, and the codes denoting the subject of the inquiry, it is not necessary that these codes be stored up in the computer itself, so as to be repeated at its output as a preliminary to transmitting the response information. Such preliminary or identifying code groups may equally well be stored up in a separate buffer recorder at the central station while the computer look-up is accomplished, and then automatically reproduced to the radio transmitter just ahead of the reproduction of the information found by the computer itself.

We claim:

1. In combination, a wave signal transmitter, a message code group selecting keyboard, buffer storage means for recording, in advance of transmission, a series of code groups selected by said keyboard, said keyboard including a particular key for generating an "end-of-message" code constituting the last code group of said series, control means in said buffer storage means associated with said "end-of-message" code, means responsive to the reading-out of code groups from said buffer storage means to modulate said transmitter in accordance with all the codes of said series, and means, responsive solely to the reading out of said end-of-message code group from said buffer storage means, for deenergizing said transmitter.

2. A remote-station code transmitter for use with a data transmission system that includes a central station having data code processing equipment, a wave signal receiver, and means for storing received signal codes that are later to be applied to said processing equipment; said remote-station code transmitter including a wave signal transmitter, a message code group selecting keyboard, buffer storage means for recording, in advance of transmission, a series of code groups selected by said keyboard, said keyboard including a particular key for generating an "end-of-message" code constituting the last code group of said series, control means in said buffer storage means associated with said "end-of-message" code, and means responsive to the reading-out of code groups from said buffer storage means to modulate said wave signal transmitter in accordance with all the codes of said series; whereby said central-station signal code storing means can be readied for transferring stored signal codes to said processing equipment immediately upon recognition of said end-of-message code received from the remote station.

3. A remote-station code transmitter for use with a data transmission system, in accordance with claim 2, said remote-station code transmitter further including means, responsive solely to the reading out of said end-of-message code group from said buffer storage means, for de-energizing said wave signal transmitter.

4. A remote-station code transmitter for use with a data transmission system that includes a central station having data code processing equipment, a wave signal receiver, and means for storing received signal codes; said remote-station code transmitter including a wave signal transmitter, a message code group selecting keyboard, buffer storage means for recording, in advance of transmission, a series of code groups selected by said keyboard, said keyboard including a particular key for generating an "end-of-message" code constituting the last code group of said series, control means in said buffer storage means associated with said "end-of-message" code, and means responsive to the reading-out of code groups from said buffer storage means to modulate said wave signal transmitter in accordance with all the codes of said series; whereby said central-station signal code storing means can be readied for the reading out of stored signal codes immediately upon recognition of said end-of-message code received from the remote station.

5. A remote-station code transmitter in accordance with claim 4, further including means, responsive solely to the reading out of said end-of-message code group from said buffer storage means, for de-energizing said wave signal transmitter.

No references cited.

THOMAS B. HABECKER, *Primary Examiner.*